CICERO C. BROWN
ERNEST L. POTTS
INVENTOR.

BY

ATTORNEY

CICERO C. BROWN
ERNEST L. POTTS
INVENTOR.

United States Patent Office 3,381,939
Patented May 7, 1968

3,381,939
HYDRAULIC DRAW WORKS WITH AUTOMATIC POWER OUTPUT CONTROL
Cicero C. Brown, c/o Brown Oil Tools, Inc., P.O. Box 19236, Houston, Tex. 77024, and Ernest L. Potts, Houston, Tex.; said Potts assignor to said Brown
Filed Jan. 24, 1966, Ser. No. 522,655
9 Claims. (Cl. 254—172)

ABSTRACT OF THE DISCLOSURE

A hydraulic draw works employing hydraulic pump-motor combinations for driving a load-handling reel, and including transducer means responsive to the pressures in the hydraulic circuit and cooperating servo mechanisms for continuously and automatically varying the motor speed with changes in load to maintain a substantially constant power capability at the reel.

---

This invention relates, generally, to draw works and, more particularly, to hydraulically driven, portable drawworks.

A conventional "mechanical" draw works having, for example, a 300 horsepower capability weighs approximately 30,000 pounds, i.e., it has a 1-to-100 power-to-weight ratio. Typically, it includes a prime mover, a winch, driving chains and belts, a gear transmission, a clutch, a torque converter, safety control devices, different braking systems, etc. The operator of such a mechanical draw works is constantly busy operating clutches, shifting gears, setting and releasing brakes, pushing in-and-out various control knobs, reading instruments, checking the condition of safety devices, etc. The nature of his duties will be better appreciated, if it is remembered that the loads which the draw works must handle change rapidly: at one instant, a heavy load must be lowered into the well at a low speed, then at a fast speed; at another instant, a very light load must be raised from the well at a fast speed, then at a slow speed. The operator makes the mechanical draw-works perform the necessary job manually actuating the gearshift lever to select appropriate gear ratios, and by simultaneously operating the different brakes to control the speed of the cable carrying the load during the changing of the gears.

Obviously, the selection of an appropriate gear ratio and the actuation of the different brakes is both time consuming and results in rapid deterioration of the equipment. When the draw works must be serviced in the field, several technicians may become idle until this draw works is either fixed or another is brought to the job.

Consequently, it is a main object of this invention to provide a new and improved draw works which obviates the foregoing and other disadvantages of prior art mechanical draw works.

It is another object of this invention to provide a new and improved hydraulic draw works which is safe, dependable, and relatively inexpensive to manufacture.

It is a further object of this invention to provide a new and improved hydraulic draw works which is relatively easy to operate even when the prime mover is remotely positioned with respect to the well.

It is yet another object of this invention to provide a new and improved compact, hydraulic draw works whose elements can be mounted on separate skids for ease of operation and control.

It is another object of this invention to provide a new and improved hydraulic draw works having a relatively high power-to-weight ratio.

It is yet another object of this invention to provide a new and improved draw works whose prime mover can be allowed to run at a constant speed (for example, which corresponds to the maximum torque) thereby saving fuel.

It is a further object of this invention to provide a new and improved draw works whose prime mover can be easily disconnected from the winch when needed, for example, to operate auxiliary machines.

It is a still further object of this invention to provide a new and improved draw works which is highly efficient in transmitting power from the prime mover to the load and in utilizing the full power capability of the prime mover.

It is yet another important object of this invention to provide a new and improved draw works in which the speed of and the torque on the reel are continuously and automatically varied with changes in load to maintain a substantially constant power capability at the winch.

The above and other objects of this invention will become apparent from the following description when taken in conjunction with the accompanying drawings in which.

The new and improved draw works of the present invention makes use of hydraulic motors and pumps which are similar in construction and, therefore, the structural description of the pump is equally applicable to the motors and will not be repeated. Most hydraulic motors presently used are of the gear, vane, or piston type. Piston-type motors have the lowest internal leakage and, therefore, the highest efficiency. They are compact and have low inertia of rotating parts. For these and other well-known reasons, piston-type motors are preferred for the draw works of this invention. They are known as "axial-piston" motors and are commercially available. The exact motor size needed can be determined from the torque and speed, i.e., power requirements imposed on the reel. Also, in selecting a particular axial-piston motor, the maximum allowable motor pressure is compared with the expected maximum pressure in the main hydraulic circuit.

Figure 2:
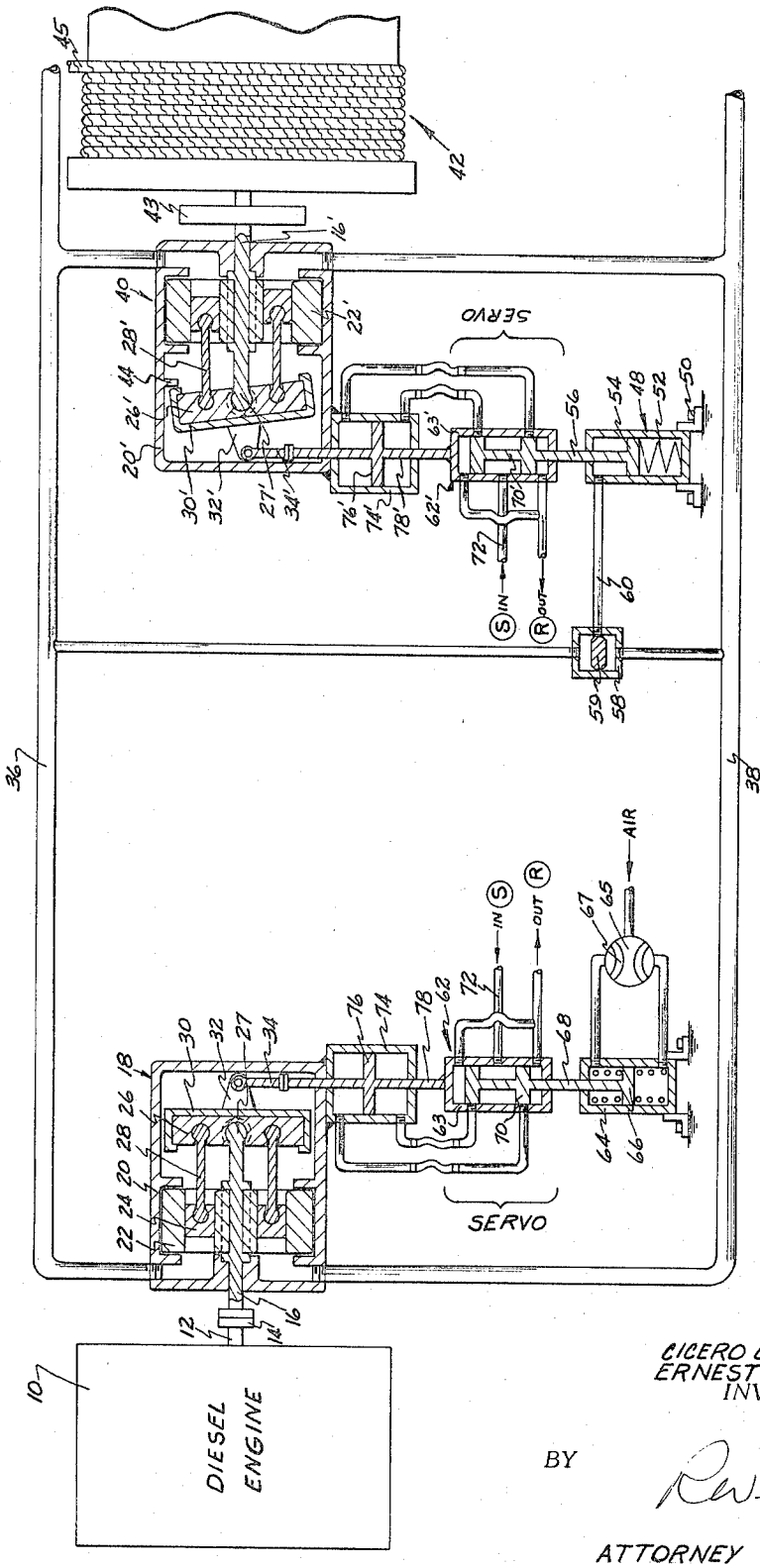
FIGURE 2 is a diagrammatic showing of the main hydraulic circuit when no fluid flows therein.
Figure 3:
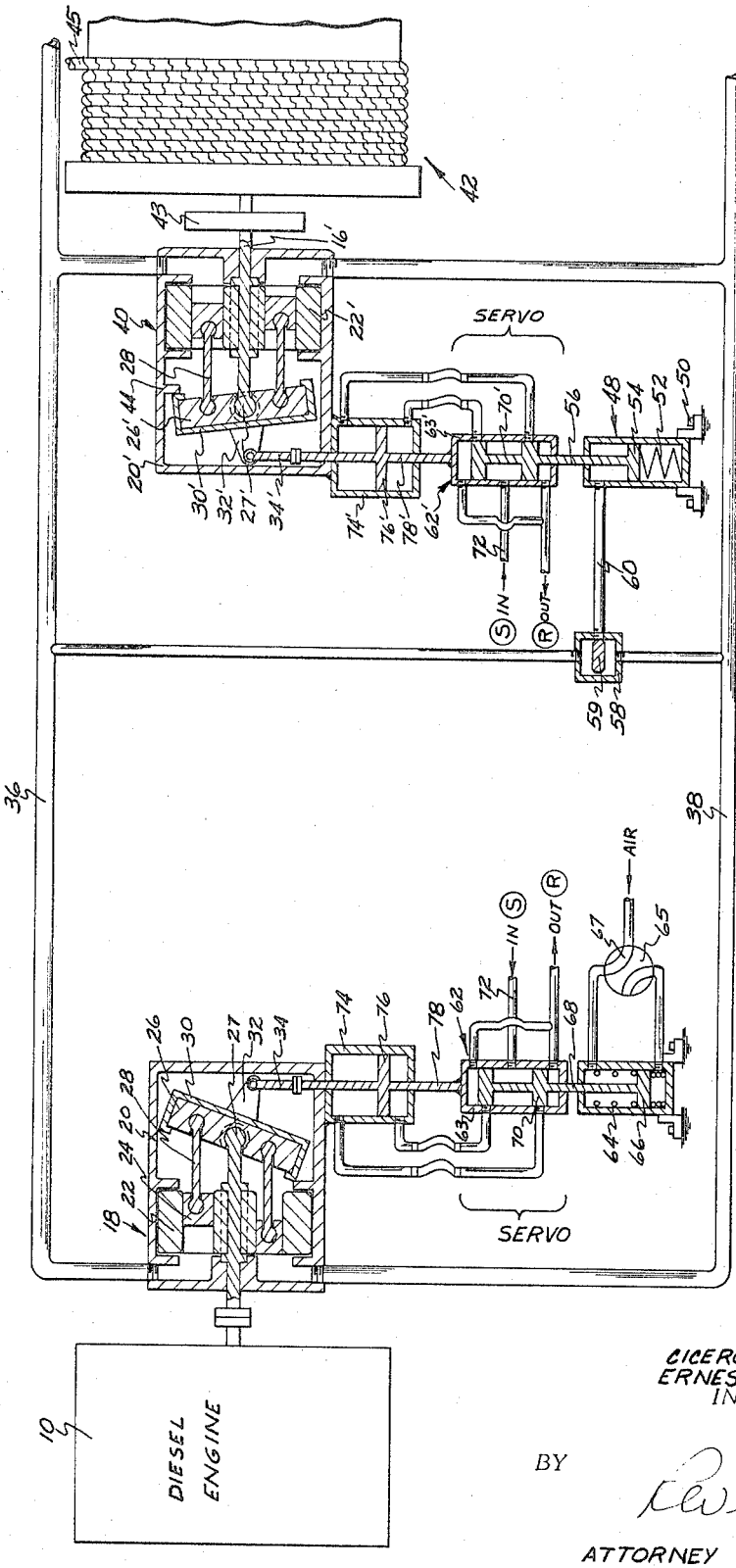
FIGURE 3 is similar to FIGURE 2 except that fluid is flowing in the main circuit and the motors rotate at their maximum speed.
Figure 4:
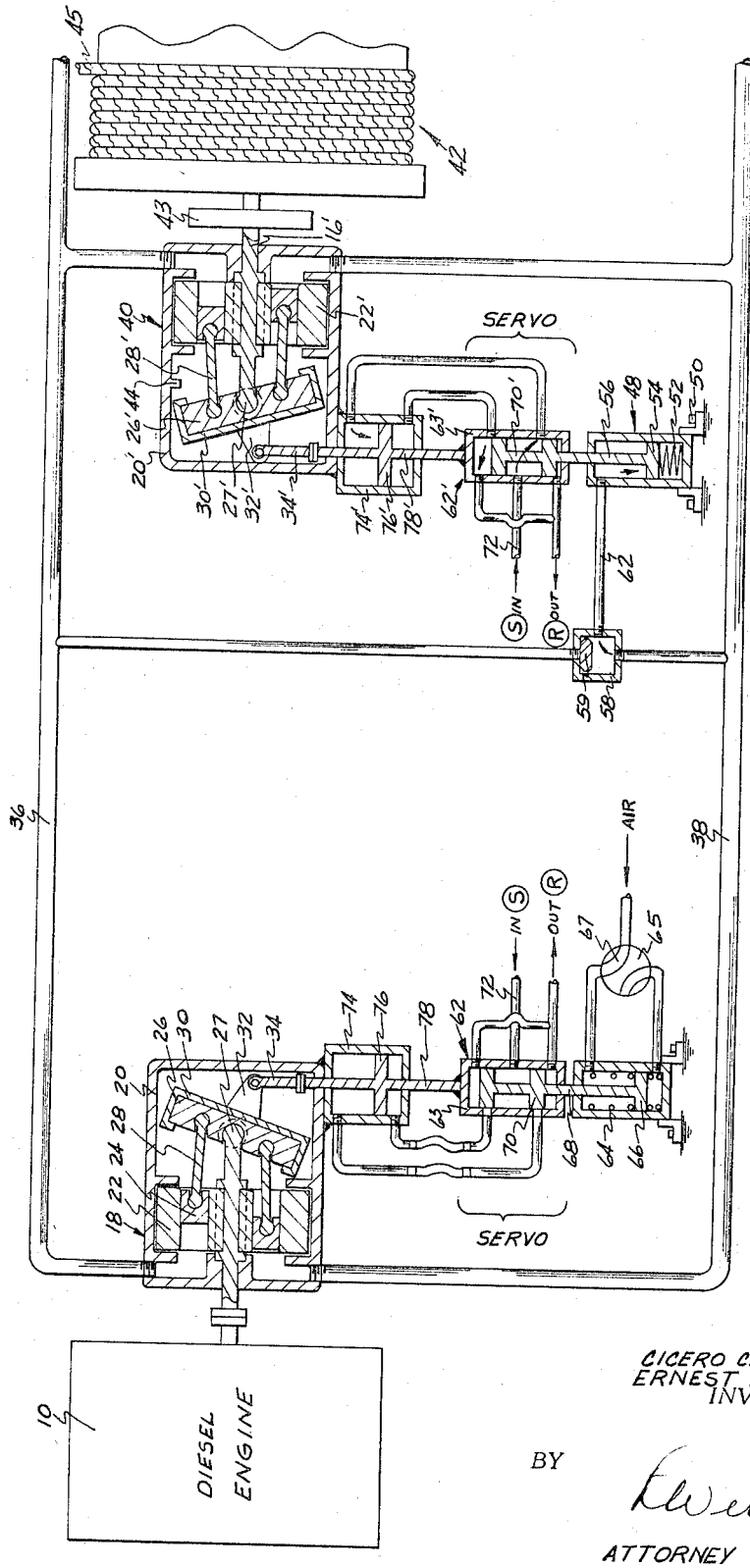
FIGURE 4 is similar to FIGURE 3 except that the pump delivers its maximum volume and the motors rotate at a lower speed.

Referring to the drawings, and especially to FIGURES 2 through 4, for a description of the main hydraulic circuit, there is shown a Diesel engine 10 having its shaft 12 coupled by a coupling device 14 to the shaft 16 of an axial-piston pump 18. The pump has a housing 20 in which is mounted a rotating cylinder 22 fixedly secured to the shaft 16. An odd number of pistons 24 is spaced circumferentially in cylinder 22. A base plate 26 is positioned near the cylinder 22 and is connected to the pistons 24 by connecting rods 28. The base plate 26 is flexibly coupled to shaft 16 by a universal joint 27. Rotation of the shaft 16 causes cylinder 22, pistons 24, base plate 26 and rods 28 to rotate together as an assembly about the axis of shaft 16. The base plate 26 is rotatably mounted in a cam plate 30. A centrally disposed bracket 32, fixedly secured to cam plate 30, is pivotally mounted on a control rod 34. Linear movement of rod 34 causes cam plate 30 and, hence, base plate 26 to tilt relative to the axis of shaft 16.

When base plate 26 tilts, the connecting rods 28 change the strokes of pistons 24.

In operation of the pump 18, when base plate 26 is in a plane perpendicular to the axis of shaft 16, as shown in FIGURE 2, the stroke of pistons 24 is zero and no fluid circulates through the pump. By tilting the cam plate 30, the pistons 24 are pushed into cylinder 22 in one-half revolution of base plate 26 and are pulled out in the other half revolution, thereby creating a pumping action. Oil is drawn into the pistons during one-half revolution and forced out ahead of the pistons during the other half revolution. The greater the tilt angle of base plate 26, the greater the stroke of pistons 24 and, hence, the greater the volume pumped by pump 18. The direction of fluid flow through the pump can be reversed nearly instantaneously by tilting the inclinable base plate 26 in the opposite direction relative to the axis of shaft 16.

The fluid pumped by pump 18 is fed via main hydraulic lines 36, 38 to two identical motors 40, 41, each mechanically coupled to one enlarged end of a reel 42 on which is spooled a load-carrying cable 45. Since the speed of rotation of reel 42 at any time is usually considerably less than the operating speed of motors 40, 41, a conventional planetary reduction gear 43 is interposed between each of the motors and the reel to provide an appropriate drive ratio therebetween.

While one hydraulic motor could be employed, if desired, two motors are preferred in order to obtain a greater torque at very low load speeds and a better dynamic balance of the reel.

To better bring out the similarity in design between pump 18 and motor 40, the internal parts of motor 40 are assigned the same reference characters, followed with a prime, as their corresponding parts in pump 18. In the motors is provided a stop member 44 which makes the minimum angle of tilt to be seven degrees. In the motors and pump, the maximum angle of tilt is twenty degrees. Direction of rotation of motor 40 is controlled by the fluid flow through the motor and, hence, by the position of the cam plate 30 relative to the axis of shaft 16 in pump 18. Since the cam plate 30' is always tilted at least seven degrees, any fluid flow through motor 40 will impart rotation to its shaft 16'. The angular velocity of shaft 16' can be continuously varied by changing the tilt angle from seven to twenty degrees, and vice versa. When the tilt of cam plate 30' is seven degrees (as shown in FIGURES 2–3), the pistons' stroke is the shortest; less fluid volume is needed to rotate the inside motor assembly, and the pump has its maximum speed and minimum torque. By choosing an angle less than seven degrees, the maximum speed could be increased. Since the speed above a certain maximum could become dangerous, the provision of the limit member 44 is indicated. On the other hand, when the tilt is twenty degrees, the pistons' stroke is longest, requiring more fluid to rotate shaft 16'; this is the position of maximum torque and minimum speed.

In accordance with one important aspect of this invention, motor 40 is made to automatically and continuously develop, for a given input power, a substantially constant output horsepower while handling the loads on reel 42. The input power to motor 40 provided by pump 30 is directly related to the fluid flow velocity and its pressure ($HP = K \times g.p.m. \times p.s.i.$, where $K$ is a constant). The torque requirements of the loads on reel 42 govern the pressure in motor 40 and, hence, in supply lines 36, 38. The fluid pressure in lines 36, 38 is continuously monitored by a pressure transducer 48 fixedly secured to the winch skid by bolts 50. Transducer 48 includes a calibrated spring 52, a piston 54 from which extends through the housing a rod 56. Since the pressure can be higher in either line 36 or 38, there is provided between lines 36, 38 a shuttle valve 58 which supplies to a line 60 either the pressure on line 36 or on line 38, whichever is greater.

While the control rods 34 and 34' in pump 18 and motor 40 could be actuated by simple pressure cylinders, the forces necessary to tilt the connecting cam plates make it desirable to employ hydraulic servo valves 62, 62' (acting as hydraulic amplifiers), which can be obtained from the same manufacturer supplying the pumps and motors.

The primary actuator for pump 18 is a low-pressure, air-operated cylinder 64 whose piston 66 is coupled by a rod 68 to a spool 70 inside housing 63 of servo 62. Housing 63 is "floating" allowing spool 70 and housing 63 to become displaced relative to each other. When spool 70 becomes displaced by piston 66, high-pressure fluid supplied by a line 72 passes through servo 62 to a pressure cylinder 74. Inside cylinder 74 is a piston 76 fixedly attached to a rod 78 which is coupled at one end to control rod 34 and at the other end is fixedly attached to the servo's housing 63. Thus when spool 70 becomes displaced, high-pressure fluid enters cylinder 74 actuating piston 76. The displacement of piston 76 causes, on one hand, base plate 26 to tilt, and, on the other hand, housing 63 to move relative to its spool 70 by a distance equal to the original displacement of spool 70 and in the same direction. After the displacements of spool 70 and housing 63, the servo valve 62 again prevents the high-pressure fluid from entering cylinder 74. Hydraulic fluid is locked in on each side of piston 76, keeping control rod 34 securely in place until another command from the throttle of pump 18 causes air pressure to be admitted into air cylinder 64 raising or lowering piston 66 therein.

In FIGURE 2, pistons 66 and 76 are shown in their mid-stroke positions. In FIGURE 3, they are shown at one end of their respective strokes (left-hand strokes): cam plate 30 is tilted twenty degrees clockwise with respect to its neutral position shown in FIGURE 2. When the pistons 66, 76 reach the other end of their respective strokes (right-hand strokes), cam plate 30 becomes tilted twenty degrees counter-clockwise. Thus, the hydraulically driven servo valve 62 transmits the displacement of rod 68 to the rod 78 and hence to the control rod 34. While these displacements of the rods are equal and in the same direction, the "signal" force which becomes available on rod 68, in response to an air command signal, is greatly amplified by the servo 62 to develop the considerable force required by rod 78 to tilt the cam plate 30.

The cam control system of motor 40 also includes a pressure cylinder 74' and a servo valve 62', both functioning in the manner as explained above. In the case of the motor, however, the servo valve 62' is actuated by the output from the pressure transducer 48. The spring 52 is such that only pressures greater than 1000 p.s.i. can push piston 54 down against the spring's force. The seven degree tilt in motor 40 provides a sufficient torque on shaft 16' to handle light loads on reel 42. As previously mentioned, an increase in load torque causes a corresponding increase in the main line pressure. When the line pressure exceeds 1000 p.s.i. on, say, line 36, the vane 59 in shuttle valve 58 will move down allowing the line 36 pressure to exert a force, through line 60, on piston 54 and move it down. A downward displacement of piston 54 moves spool 70' also down. High-pressure fluid on line 72 then passes through servo 62' into cylinder 74' (as shown by the arrows in FIGURE 4) and exerts a downward force on piston 76'. When piston 76' moves down, it tilts the base plate 26' counter-clockwise from its rest position (as shown in FIGURE 3). On the other hand, piston 76' also moves down the housing 63' of servo 62' to cut the high-pressure fluid off and to lock piston 76'. Here, again, a downward displacement of rod 56 resulted in an equal displacement of control rod 34'. Also, the servo valve 62' and the pressure cylinder 74' are merely used to amplify the command signal provided by pressure transducer 48. Although in the preferred embodiments a spring-type pressure transducer is employed, it will be appreciated that other pressure transducers can equally be used. For example, instead of resulting in a displacement, the command signal could be an electrical voltage or current and the servo valve could be electrically operated, as will be understood by those skilled in the art.

When the cam plate 30' tilts away from stop 44 in response to an increase in line pressure, the speed of shaft 16' decreases and its torque increases so that the horsepower developed by motor 40 remains substantially constant. The magnitude of this power is determined by the volume of fluid pumped through the motor by the pump 18. When the load torque is at its expected maximum, the line pressure reaches its maximum value, piston 54 reaches its lowest level, causing cam plate 30' to assume its maximum tilt angle of twenty degrees (as shown in FIGURE 4); the speed velocity of shaft 16' is then at a a minimum and its torque at a maximum.

Figure 1:
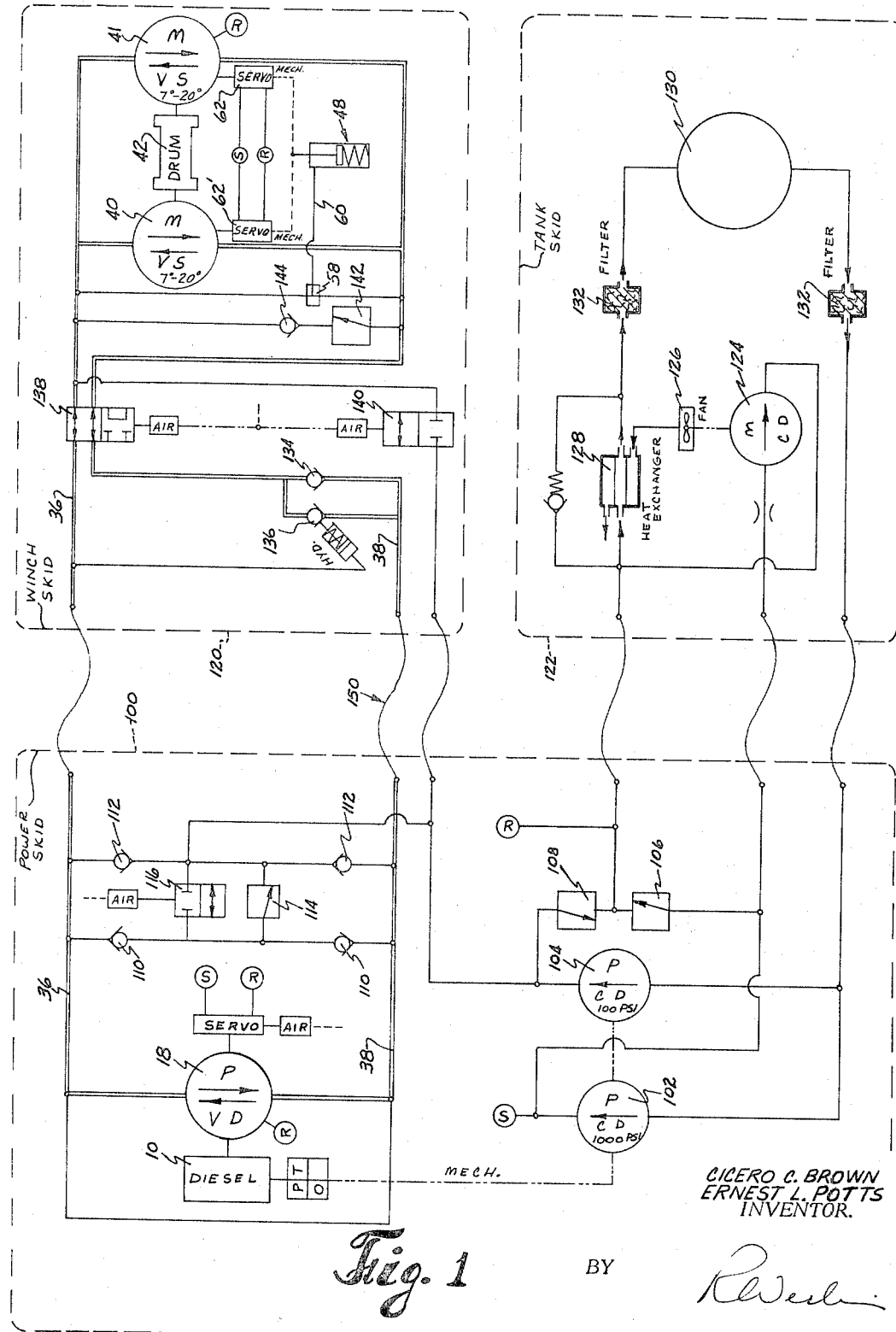
FIGURE 1 is a schematic diagram of the draw works assembly which includes a power, a tank, and a winch skid.

Referring now more specifically to FIGURE 1, there is shown schematically a diagram of the drawworks assembly. The main hydraulic circuit between the pump and the motors, which was described in conjunction with FIGURES 2-4, is here represented by double lines.

The prime mover 10 and the axial-piston pump 18 are located on a power skit 100, shown boxed in by the dotted lines. Also located on the power skit 100 is a high-pressure, constant-delivery pump 102 and a relatively low-pressure, constant-delivery pump 104. Both pumps 102, 104 are driven by a power take-off from the diesel 10. The output lines from pumps 102, 104 are fitted with pressure-relief valves 106, 108, respectively. A series of check-valves is connected between the two main circuit lines 36, 38 at a point near pump 18: two check-valves 110 and two check-valves 112, each pair connected across the main circuit lines 36, 38. A pressure-relief valve 114 is mounted between the junctions of the check valves to allow pressure above a set minimum to pass from the intake line to the exhaust line around the pump 18. Thus if excess pressure should accidentally build up in either of the main circuit lines 36, 38, it will enter one of the intake check-valves 110, pass through the pressure relief valve 114, and exit through the opposite exhaust check-valve 112. An air operated cross-over valve 116 is provided between the intake and exhaust check-valve lines. It becomes automatically actuated, whenever pump 18 is in its neutral (non-pumping) position, to allow crossover between the main circuit lines 36, 38. The reason for this is that if pump 18 creeps in neutral this would cause the reel 42 to creep also. By allowing the fluid to short circuit, cross-over valve 116 prevents the reel from following the pump 18. The main output for the supercharged pressure from pump 104 is into the exhaust check-valve line. From there the super-charged pressure passes through that valve 112 which is connected to the line (36 or 38) having the lower pressure.

In addition to the power skid 100 there is also provided a winch skid 120 and a tank skid 122, both represented by dotted lines. The pump 102 drives a constant-speed, hydraulic motor 124 whose shaft is coupled to a fan 126. The fan is used to cool a heat exchanger 128 which is positioned in the return line to a main hydraulic fluid reservoir or tank 130 having, for example, a capacity of 250 gallons. All the lines ending with a circle enclosing the letter R are connected with the R return line to the reservoir 130. The line ending with a circle enclosing the letter S on the output side of pump 102 connects with the input lines marked S on the servo valves. The high-pressure fluid, previously described in connection with the servo valves, is supplied by the pump 102. The pump 104 raises the main line pressure to more than atmospheric pressure. This causes the fluid to rapidly flow into the voids on the intake side of pump 18. Any extra fluid not needed by the systems will raise the line pressure, open the relief valves 106, 108 and return to the reservoir 130 after passing through the heat exchanger 128 and filter 132. Also connected to the return line R are the return lines from the servo valves and the drain returns from the pump 18 and the motors 40 and 41.

When the draw works is reeling in, i.e., lifting a load, circulation through the main lines 36, 38 is counter-clockwise. A check valve 134 is installed on the input line 38 to the motors. Fluid can pass through valve 134 in a counter-clockwise direction but not in a clockwise direction. If the pump 18 or prime mover 10 should fail, while reeling in, the back-check valve 134 would prevent the return of the fluid and therefore lock the motors 40, 41 against the weight of the load (the motors act as hydraulic safety brakes). A hydraulic-operated valve 136 is arranged to by-pass the check valve 134 when intentional clockwise flow through the main circuit is desired, as when reeling out. When reeling out, reducing the flow in the main circuit makes the motors act as dynamic brakes. An air-operated valve 138 can shut off fluid circulation to the motors in order to make available the prime mover 10 and pump 18 to operate other auxiliary machines, such as a hydraulically driven mud pump. When valve 138 is closed, cutting off circulation to the motors, an air-operated valve 140 is simultaneously opened, allowing super-charged fluid from pump 104 into the now isolated winch circuit. This replaces any fluids leaking out from the motors and maintains the winch hydraulic circuit supercharged so that the motors 40, 41 are ready for use whenever valve 138 is re-opened. A pressure-relief valve 142 and a back-check valve 144 are provided on a line connecting the two main circuit lines 36, 38 before they reach the motors. Valve 144 prevents any flow through its line when fluid circulation is clockwise. Pressure relief valve 142 dumps any extremely high pressure which could very quickly build up in the input lines when, for example, the reel suddenly stops, as when the motors are reeling in a pipe which accidentally and suddenly gets stuck in the bore hole.

Figure 5:
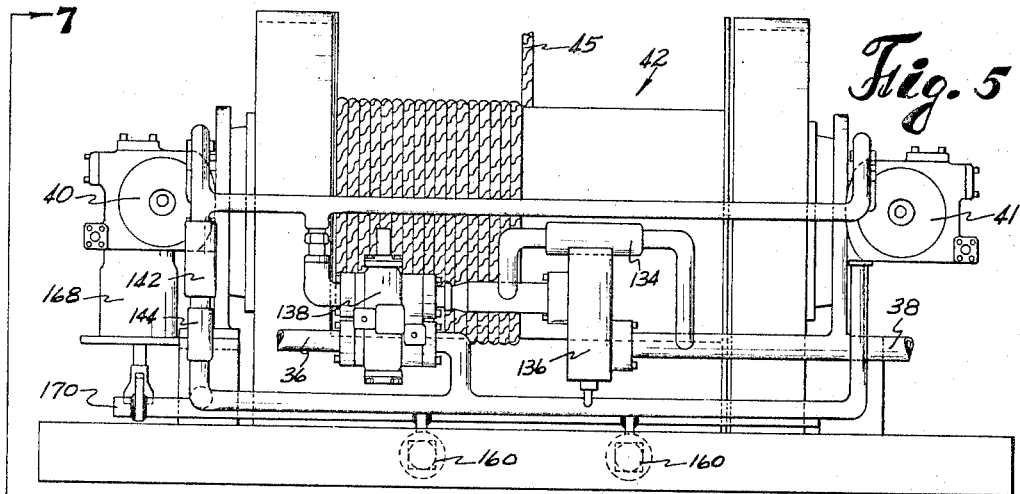
FIGURE 5 is a rear view of the winch skid.
Figure 6:
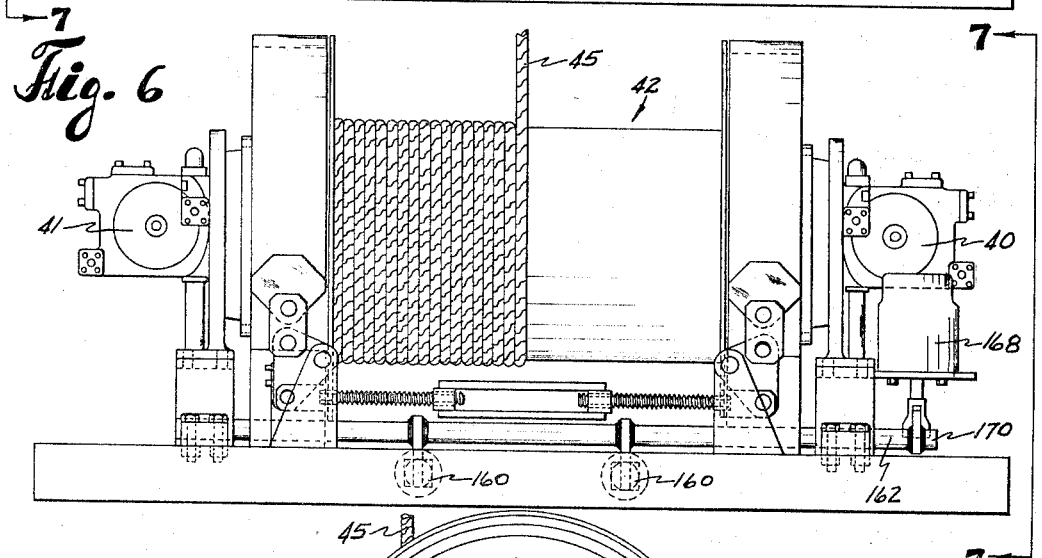
FIGURE 6 is a front view of the winch skid.
Figure 7:
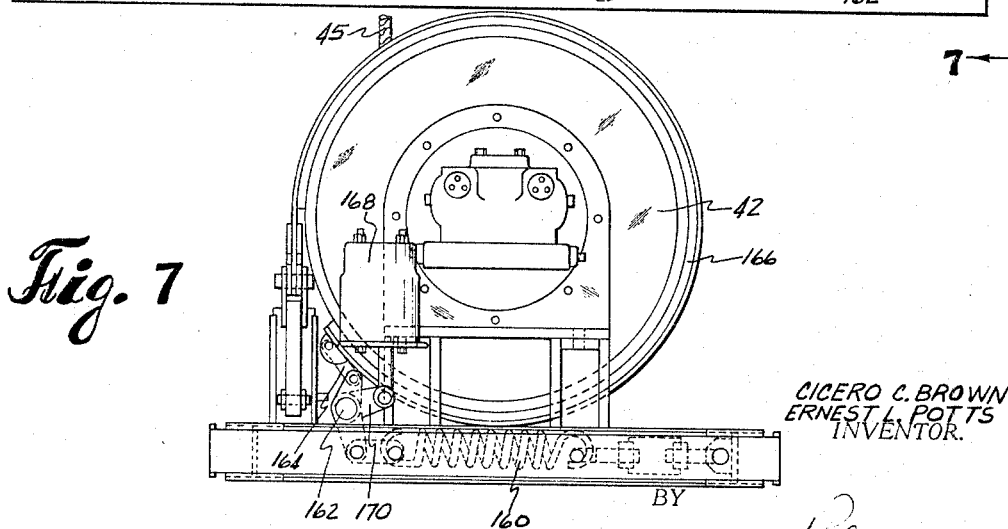
FIGURE 7 is an end view of the winch skid.

In FIGURES 2-4 the air cylinder 64 is actuated through a throttle valve 65 having a valve spool 67. In FIGURE 2 the spool 67 (throttle) is in its "neutral" position. In this position, the pump delivers no fluid to the motors 40, 41. In FIGURES 3 and 4, the throttle is fully set on one side of the neutral position. Positioning the throttle on the other side of its neutral position would reverse the flow of fluid through pump 18. In FIGURES 5-7 the arrangement of the valves on and across the main lines 36, 38 can be clearly seen. FIGURES 5-7 in addition illustrate conventional mechanical safety brakes. These are automatically spring-locked whenever the power fails or whenever the throttle control for pump 18 is set in neutral. A spring 160 acts through a rod 162 to push upward on linkage 164 and tightens a brake band 166 around the large diameter end of the reel 42. An air cylinder 168 acts through a lever 170 on the rod 162 tending to rotate the rod clockwise and release the brake band 166. Whenever the power is off or the pump throttle is in neutral, the air cylinder is not pressurized and springs 160 set the brakes. When the pump throttle is moved from its neutral position, air pressure simultaneously enters cylinder 168 and releases the brake bands.

Figure 8:
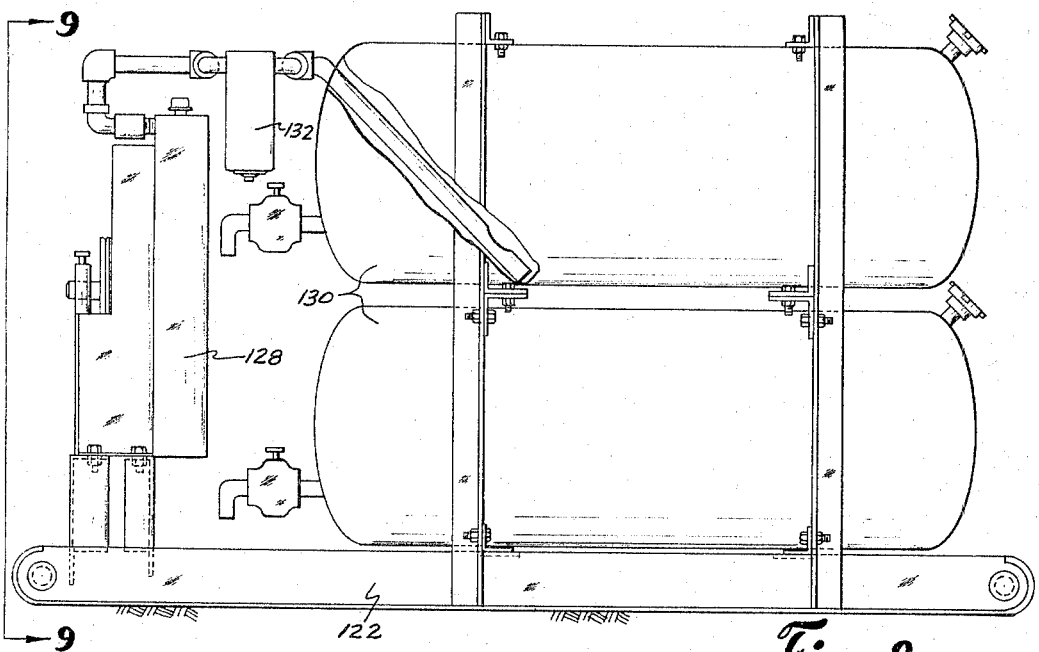
FIGURE 8 is a side view of the tank skid.
Figure 9:
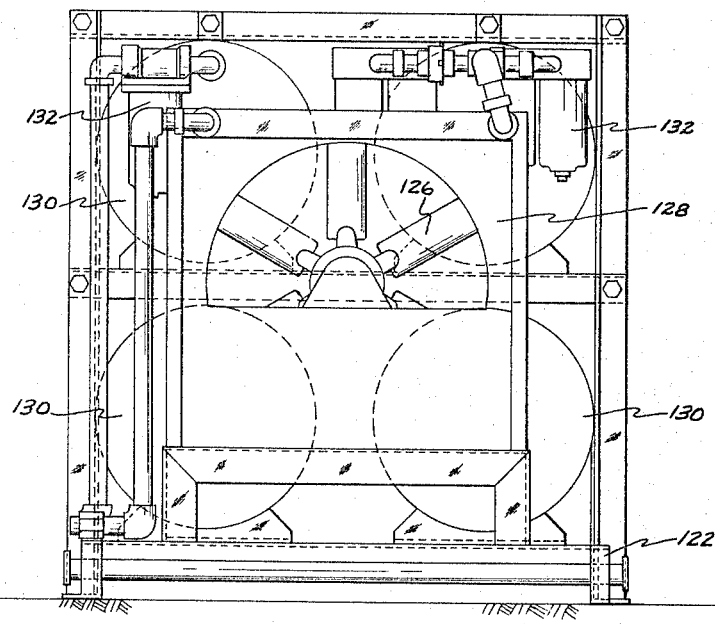
FIGURE 9 is an end view of the tank skid.

FIGURES 8 and 9 show views of the tank skid on which are mounted two hydraulic reservoirs 130 into which the fluid is returned via a heat exchanger 128 and a filter 132. A relatively large fan 126 cools the heat exchanger 128. The fluid flows into reservoirs 130 through another filter 132.

A brief summary description of the operation of the draw works will now be given. The portable, compact winch skid 120 is brought in alignment with the well. The power skid 100 and the tank skid 122 can be remotely positioned. The hydraulic coupling lines 150 are then placed to establish hydraulic communication between the three skids. The prime mover engine 10 may be set to run at a constant speed (corresponding to maximum torque) thereby conserving fuel. The air cylinder 64 is then operated to cause the pump 18 to deliver a desired output into the main hydraulic circuit 36, 38. For reeling in, the flow is counter-clockwise through the back-check valve 134. When the line pressure is less than 1000 p.s.i., the cam plates 30' in the motors 40, 41 will be at their minimum tilt positions against the limit stops 44. The motors will have a sufficient torque capability to handle loads up to a predetermined amount. When a load exceeds this amount, the pressure on line 38 rises above 1000 p.s.i., compressing spring 52. The down movement of piston 54, which is mechanically coupled to servos 74' of motors 40, 41, causes the cam plates 30' to tilt by an angle corresponding to the displacement of piston 54. This results in a decrease in the speed of the reel 42 and in a corresponding increase of the torque. Thus, a load change causes through transducer 48 an instantaneous decrease in speed and increase in torque or vice versa. The design factors are such that the output horsepower of motors 40, 41 remains substantially constant over the expected load range.

It will be appreciated that the operator by merely controlling the position of valve spool 65 in air valve 67 can set the cam plate 30 in pump 18 in neutral position (no pumping) or on either side of the axis of shaft 16 (pumping in either clockwise or counter-clockwise direction). The actuation of air cylinder 64 through the valve 67 is the main throttle control to be manipulated by the operator. The brakes are automatically set and released. The gear ratio between the speed of the pump and the speed of the motors is automatically selected by the load on cable 45.

It will be further appreciated that the draw works of the present invention, by having the two hydraulic motors 40, 41 drive the reel 42, by monitoring the line pressure so as to provide a substantially constant output horsepower for handling varying loads, by continuously utilizing the full horsepower of the prime mover, by allowing the prime mover and pump (power sources) to become easily disconnected from the winch, by providing the secondary hydraulic circuits for safety and control purposes, by allowing the various elements to be mounted on separate skids, by eliminating the need for different brakes, by greatly reducing the weight and bulk of conventional draw works, by greatly increasing the power-to-weight ratio (a factor of seven or even ten is possible), achieves the objects herein set forth and others which will become readily apparent to those skilled in the art.

While specific embodiments have been described and illustrated, it will be understood that various modifications may be made within the scope of the invention which is defined in the following claims.

What is claimed is:

1. A draw works having a reel for handling loads in a well comprising: a prime mover, a variable-speed, axial-piston, hydraulic pump, at least one variable-speed, axial-piston, hydraulic motor for driving said reel, a hydraulic circuit including at least an input line and a return line coupling said motor to said pump, a movable member in said motor capable of assuming distinct positions within a predetermined displacement range, pressure transducer means coupled to said circuit for monitoring the pressure in said circuit when the pressure in either of said lines exceeds a predetermined value to produce an output, coupling means responding to the output of said transducer means and causing said movable member to displace by an amount sufficient to maintain the power developed by said motor substantially constant over a predetermined range of load variation.

2. A draw works having a reel for handling loads in a well comprising: a prime mover, a variable-speed, axial-piston, hydraulic pump driven by said prime mover, at least one variable-speed, axial-piston, hydraulic motor having a rotatable shaft coupled to said reel, a hydraulic circuit including at least an input line and a return line coupling said motor to said pump, a movable member in said motor, the speed of said shaft being determined by the position of said movable member within a predetermined displacement range; a pressure transducer coupled to said circuit to sense the higher pressure in either of said lines, said transducer having a housing, a piston in said housing, a rod extending from one face of said piston, the other face being mounted on a resilient spring, said housing having an opening for admitting fluid at said higher pressure to act on said one face thereby compressing said spring by amounts corresponding to pressure changes in said fluid, means coupling said rod to said movable member thereby transmitting the displacements of said piston to said movable member and causing the speed of said motor to change in dependence on said pressure changes.

3. A draw works comprising: a prime mover, an axial-piston pump driven by said prime mover, an axial-piston motor, a hydraulic circuit including at least an input line and a return line coupling said pump to said motor, said pump and said motor each having a stroke-determining rotatable member, means selectively controlling the position of said member in said pump, and means including pressure transducer means coupled to said circuit and responsive to the higher pressure in either of said lines to automatically control the position of said member in said motor to vary the output torque of said motor in correspondence with pressure variations detected by said transducer in said circuit above a predetermined minimum pressure value, thereby maintaining the output power of said motor substantially constant over a predetermined range of load variation.

4. A draw works having a reel for handling loads in a well comprising: a prime mover, an axial-piston hydraulic pump driven by said prime mover, an axial-piston hydraulic motor operatively coupled to each end of said reel, each of said motors having a stroke-determining rotatable member, a hydraulic circuit having at least an input line and a return line coupling said pump to said motors, pressure transducer means coupled to said circuit and being responsive to the higher pressure on either of said lines, a servo valve for each motor, means coupling the output of said pressure transducer to the input of each servo valve, and means coupling the output of one servo valve to a stroke-determining rotatable member in one motor and the output of the other servo valve to a stroke-determining rotatable member in the other motor, the positions of said rotatable members determining the speed of said motors.

5. A draw works for handling loads in a well, comprising in combination, a load-supporting reel, a hydraulic motor operatively coupled to each end of the reel, a prime mover remotely located with respect to said reel, a hydraulic pump connected to a source of pressure fluid and driven by said prime mover, a conduit circuit for circulating said pressure fluid between said pump and both said motors, and valve means in said conduit circuit operable upon the occurrence of a failure in said draw works to automatically lock pressure fluid in said motors to thereby cause said motors to function as a brake for the load on the reel.

6. A draw works comprising, a prime mover, an axial-piston pump driven by said prime mover, an axial-piston motor, a hydraulic circuit coupling said pump to said motor, said pump and said motor each having a stroke-determining rotatable member, means selectively controlling the position of said member in said pump, and means including pressure transducer means automatically controlling the position of said member in said motor to vary the output torque of said motor in correspondence with pressure variations detected by said transducer in said circuit above a predetermined minimum pressure value, thereby maintaining the output power of said motor substantially constant over a predetermined range of load variation, said hydraulic circuit including at least an input line and a return line, a fluid responsive valve connected between said lines for selectively disconnecting said motor from said pump, and a check-valve in said input line for automatically locking fluid in said motor upon the occurrence of a failure in said draw works.

7. A draw works for handling loads in a well, comprising in combination, a load-supporting reel, a hydraulic motor operatively coupled to each end of the reel, a prime mover remotely located with respect to said reel, a hydraulic pump connected to a source of pressure fluid and driven by said prime mover, a conduit circuit for circulating said pressure fluid between said pump and both said motors, and check valve means in said conduit circuit arranged to be operable in response to reverse flow of pressure fluid from said motors to automatically lock pressure fluid in said motors to function as a brake for the load on the reel.

8. A draw works having a reel for handling loads in a well comprising: a prime mover, an axial-piston hydraulic pump driven by said prime mover, an axial-piston hydraulic motor operatively coupled to said reel, said motor having a stroke-determining rotatable member, a hydraulic circuit having at least an input line and a return line coupling said pump to said motor, pressure transducer means coupled to said circuit and being responsive to the higher pressure on either of said lines, a servo valve for the motor, means coupling the output of said pressure transducer to the input of said servo valve, and means coupling the output of said servo valve to the stroke-determining rotatable member in said motor, the position of said rotatable member determining the speed of said motor.

9. In a draw works according to claim 8, stop means limiting the movements of said stroke-determining member between positions determining minimum and maximum speeds for the motor.

References Cited

UNITED STATES PATENTS

| 2,008,687 | 7/1935 | Dean | 254—172 |
|---|---|---|---|
| 3,203,185 | 8/1965 | Williams | 60—53 |
| 3,213,618 | 10/1965 | Cadiou | 60—53 |
| 3,237,407 | 3/1966 | Jennings | 60—53 |
| 3,238,724 | 3/1966 | Miller | 60—53 |
| 3,106,108 | 10/1963 | Thoma | 60—53 |
| 3,194,017 | 7/1965 | Weisenbach | 60—53 |

FOREIGN PATENTS

| 1,046,286 | 10/1957 | Germany. |
|---|---|---|
| 876,440 | 8/1961 | Great Britain. |

EDWARD A. SROKA, *Primary Examiner.*

EVON C. BLUNK, *Examiner.*

H. C. HORNSBY, *Assistant Examiner.*